United States Patent
Bowen

(10) Patent No.: US 6,490,945 B2
(45) Date of Patent: Dec. 10, 2002

(54) TWIN CLUTCH AUTOMATED TRANSMISSION WITH INTEGRATED TRANSFER CASE

(75) Inventor: Thomas C. Bowen, Rochester Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 11 days.

(21) Appl. No.: 09/757,818

(22) Filed: Jan. 10, 2001

(65) Prior Publication Data

US 2002/0088291 A1 Jul. 11, 2002

(51) Int. Cl.[7] .................................................. F16H 3/38
(52) U.S. Cl. ........................................................ 74/339
(58) Field of Search .......................... 74/330, 339, 340; 180/69.6

(56) References Cited

U.S. PATENT DOCUMENTS

| | | | |
|---|---|---|---|
| 3,834,499 A | * 9/1974 | Candellero et al. | 192/222 |
| 3,861,484 A | * 1/1975 | Joslin | 180/65.2 |
| 5,429,005 A | * 7/1995 | Fukui et al. | 74/325 |
| 5,508,574 A | * 4/1996 | Vlock | 310/113 |
| 5,603,671 A | * 2/1997 | Schmidt | 180/65.4 |
| 5,704,866 A | * 1/1998 | Pritchard et al. | 180/248 |
| 5,890,392 A | * 4/1999 | Ludanek et al. | 74/331 |
| 5,904,632 A | * 5/1999 | Brown et al. | 180/247 |
| 5,966,989 A | * 10/1999 | Reed et al. | 74/331 |
| 6,095,001 A | * 8/2000 | Ruehle et al. | 74/331 |
| 6,170,587 B1 | * 1/2001 | Bullock | 180/165 |
| 6,209,406 B1 | 4/2001 | Sperber et al. | |
| 6,209,407 B1 | 4/2001 | Sperber et al. | |
| 6,286,381 B1 | * 9/2001 | Reed et al. | 74/336 R |
| 6,289,757 B1 | * 9/2001 | Hennequet et al. | 74/340 |

* cited by examiner

Primary Examiner—Jack Lavinder
Assistant Examiner—Benjamin A Pezzlo
(74) Attorney, Agent, or Firm—Harness, Dickey & Pierce P.L.C.

(57) ABSTRACT

An automated twin-clutch multi-speed transmission is disclosed for use in a four-wheel drive vehicle. The transmission includes a first engine clutch operable to establish a releasable drive connection between the engine and a first input shaft, a first motor/generator connected to the first input shaft, a second engine clutch operable to establish a releasable drive connection between the engine and a second input shaft, a second motor/generator connected to the second input shaft, a mainshaft, and a geartrain for selectively establishing a plurality of forward and reverse speed ratio drive connections between the input shafts and the mainshaft. The transmission further includes power-operated dog clutches for selectively engaging constant-mesh gearsets associated with the geartrain, and a transmission controller for controlling coordinated actuation of the first and second engine clutches, the first and second motor-generators, and the power-operated dog clutches to permit non-power interrupted ("powershift") sequential gear changes automatically without input from the vehicle operator. An interaxle differential transfers drive torque from the mainshaft to the front and rear drivelines to establish a full-time four-wheel drive mode.

23 Claims, 5 Drawing Sheets

TWIN CLUTCH AUTOMATED TRANSMISSION WITH INTEGRATED TRANSFER CASE

FIELD OF THE INVENTION

The present invention relates generally to transmissions for use in motor vehicles and, more particularly, to a twin-clutch automated transmission applicable for use in four-wheel drive vehicles.

BACKGROUND OF THE INVENTION

Automobile manufacturers continuously strive to improve fuel efficiency. This effort to improve fuel efficiency, however, is typically offset by the need to provide enhanced comfort and convenience to the vehicle operator. For example, it is well known that manual transmissions are more fuel efficient than automatic transmissions, yet a majority of all passenger vehicles are equipped with automatic transmissions due to the increased convenience they provide.

More recently, "automated" variants of conventional manual transmissions have been developed which shift automatically without any input from the vehicle operator. Such automated transmissions typically include a plurality of power-operated actuators that are controlled by a transmission controller to shift traditional synchronized dog clutches. However, such automated transmissions have the disadvantage that there is a power interruption in the drive connection between the input shaft and the output shaft during sequential gear shifting. Power interrupted shifting results in a harsh shift feel which is generally considered to be unacceptable when compared to smooth shift feel associated with most automatic transmissions. To overcome this problem, automated twin-clutch transmissions have been developed which can be powershifted to permit gearshifts to be made under load. Examples of such automated manual transmissions are shown in U.S. Pat. Nos. 5,966,989 and 5,890,392. While such powershift twin-clutch transmissions overcome several drawbacks associated with conventional single-clutch automated transmissions, a need exists to develop simpler and more robust transmissions which advance the automotive transmission technology.

In four-wheel drive vehicles, it is common to use a transfer case for transmitting drive torque from the transmission to the front and rear drivelines. However, due to the size and weight of transfer cases, special accommodations must be made to package the transmission and transfer case under the vehicle. Thus, efforts have been made to integrate the components of the transfer case into the manual transmission. Examples of such integrated transmissions are shown in commonly-owned U.S. Pat. Nos. 5,704,866 and 5,904,632. While such integrated transmissions advance the four-wheel drive technology, a need exists to develop four-wheel drive transmissions integrating twin-clutch automated shifting systems and torque splitting systems into a common assembly.

Automobile manufacturers are also actively working to develop alternative powertrain systems in an effort to reduce the level of pollutants exhausted into the air by conventional powertrains equipped with internal combustion engines. Significant development has been directed to electric vehicles and fuel-cell vehicles. Unfortunately, these alternative powertrain systems suffer from several disadvantages and, for all practical purposes, are still under development. However, several different hybrid electric vehicles (HEV) have recently been offered for sale. These hybrid vehicles are equipped with an internal combustion engine and an electric motor that can be operated independently or in combination to drive the vehicle.

There are two types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

Such hybrid vehicles have also been adapted to four-wheel drive vehicles which typically utilize the parallel hybrid powertrain to drive the primary wheels and a second electric motor to drive the secondary wheels. Obviously, such a four-wheel drive system is not only extremely expensive and difficult to package, but is also difficult to control in view of the need to react to instantaneous instances of wheel slip. Thus, a need exists to develop hybrid powertrains for use in four-wheel drive vehicles that utilize many conventional powertain components so as to minimize specialized packaging and reduce cost.

SUMMARY OF THE INVENTION

Accordingly, it is an object of the present invention to provide a four-wheel drive twin-clutch transmission and a control system for permitting automatic shifting of the twin-clutch transmission.

As a related object, the four-wheel drive twin-clutch automated transmission of the present invention has a compact geartrain and an interaxle differential for use as an integrated transmission/transfer case in a four-wheel drive vehicle.

A further object is to provide a hybrid powertrain or drive system for a four-wheel drive vehicle equipped with the twin-clutch automated transmission of the present invention.

These and other objects of the present invention are met by providing an automated twin-clutch multi-speed transmission adapted to transfer power from the engine to front and rear drivelines of a motor vehicle. The transmission includes a first engine clutch operable to establish a releasable drive connection between the engine and a first input shaft, a first motor/generator connected to the first input shaft, a second engine clutch operable to establish a releasable drive connection between the engine and a second input shaft, a second motor/generator connected to the second input shaft, a mainshaft, and a geartrain for selectively establishing a plurality of forward and reverse speed ratio drive connections between the input shafts and the mainshaft. The mainshaft drives an input to an interaxle differential having a first output adapted to drive the rear driveline and a second output adapted to drive the front driveline such that the transmission provides a full-time four-wheel drive mode of operation. The transmission further includes power-operated dog clutches for selectively engaging constant-mesh gearsets associated with the geartrain, and a transmission controller for controlling coordinated actuation of the first and second engine clutches, the first and second motor/generators, and the power-operated dog clutches to permit non-power interrupted ("powershift") sequential gear changes automatically without input from the vehicle operator. When shifting under power between gear ratios, one engine clutch is released and the corresponding motor/generator is actuated to accelerate/decelerate the released input shaft into speed synchronization with the mainshaft. Following completion of speed synchronization, the dog clutch for the selected gearset on the released input shaft is actuated and thereafter the released engine clutch is re-engaged.

In accordance with a further feature of the present invention, the automated twin-clutch transmission can be equipped with a biasing clutch for automatically limiting slip and biasing the torque distribution between the front and rear drivelines for establishing an all-wheel drive mode of operation. In accordance with yet a further derivation of the automated twin-clutch transmission, the interaxle differential can be eliminated and a transfer clutch disposed between a primary (i.e., driven) output and a secondary (i.e., non-driven) output to establish an on-demand four-wheel drive mode of operation.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the scope of this invention will become apparent to those skilled in the art.

DETAILED DESCRIPTION OF THE PREFERRED EMBODIMENTS

In general, the present invention relates to a four-wheel drive four-wheel drive transmission which integrates the features of a twin-clutch multi-speed transmission and a transfer case into a common assembly. The twin-clutch multi-speed transmission is equipped with a pair of motor/generators that are used to advance/retard the rotary speed of the input shafts to provide a speed synchronization function that permits powershifting via actuation of a power-operated shift system.

Figure 1:
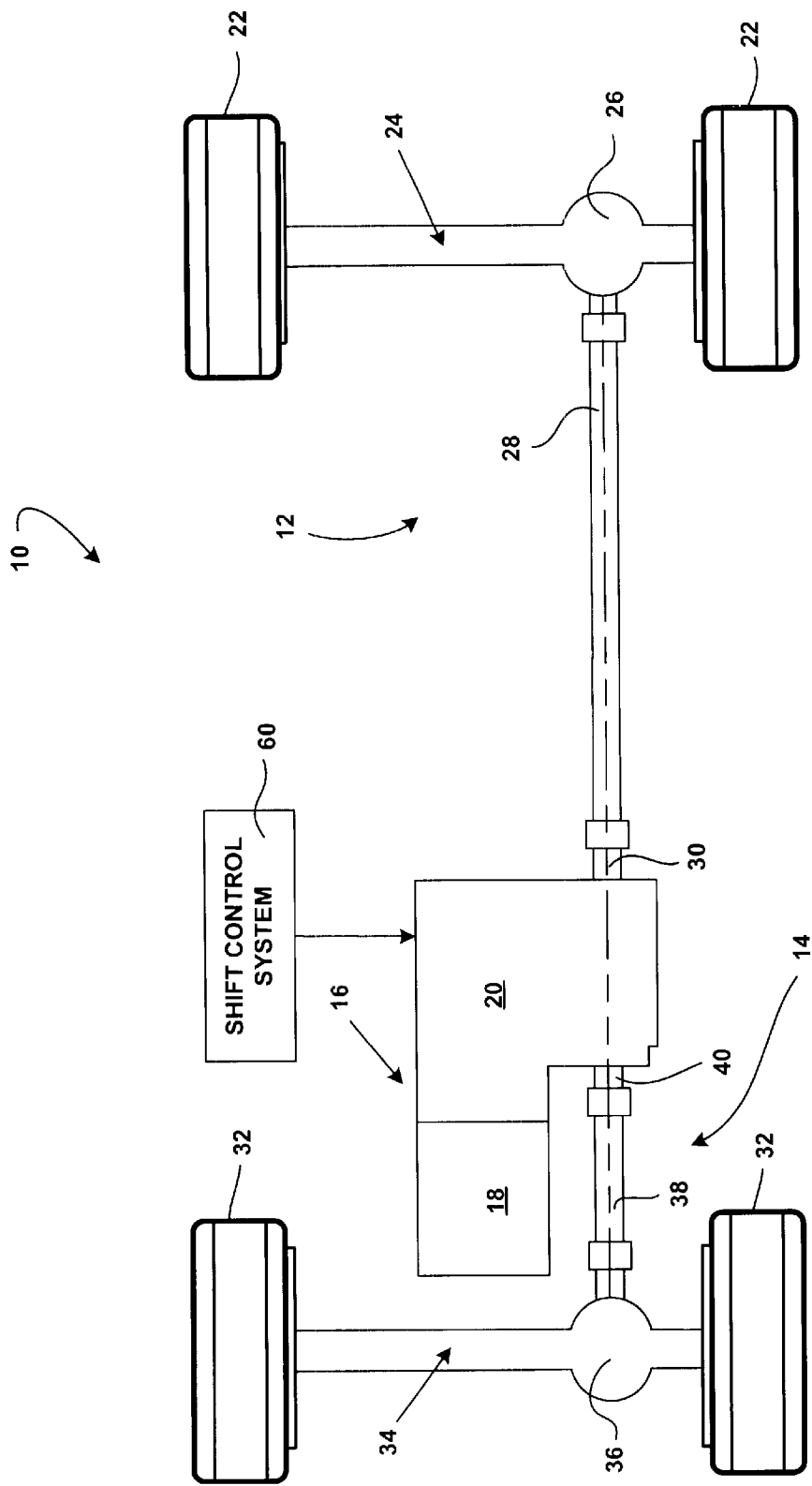
FIG. 1 illustrates a four-wheel drive vehicle equipped with the automated twin-clutch four-wheel drive transmission of the present invention.

With particular reference to FIG. 1 of the drawings, a drivetrain 10 for a four-wheel drive vehicle is shown. Drivetrain 10 includes a first driveline 12, a second driveline 14, and a powertrain 16 for delivering motive power (i.e., drive torque) to the drivelines. In the arrangement shown, first driveline 12 is the rear driveline while second driveline 14 is the front driveline. Powertrain 16 includes an engine 18 and a twin-clutch multi-speed transmission 20. Rear driveline 12 includes a pair of rear wheels 22 connected at opposite ends of a rear axle assembly 24 having a rear differential 26 coupled to one end of a rear prop shaft 28, the opposite end of which is coupled to a rear output shaft 30 of transmission 20. Front driveline 14 includes a pair of front wheels 32 connected to opposite ends of a front axle assembly 34 having a front differential 36 coupled to one end of a front prop shaft 38, the opposite end of which is couple to a front output shaft 40 of transmission 20.

Figure 2:
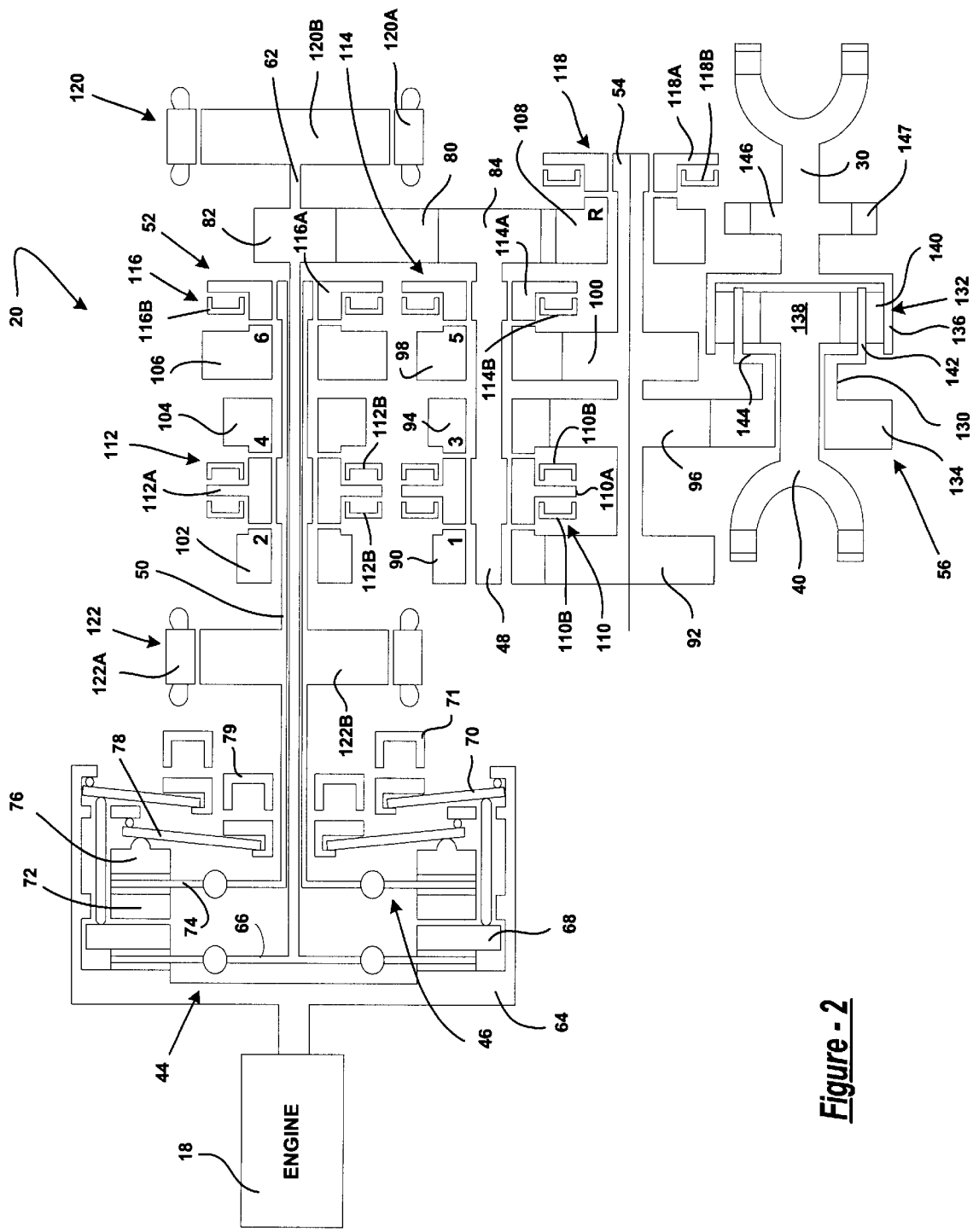
FIG. 2 is a schematic view of the automated twin-clutch transmission according to one embodiment of the present invention.
Figure 3:
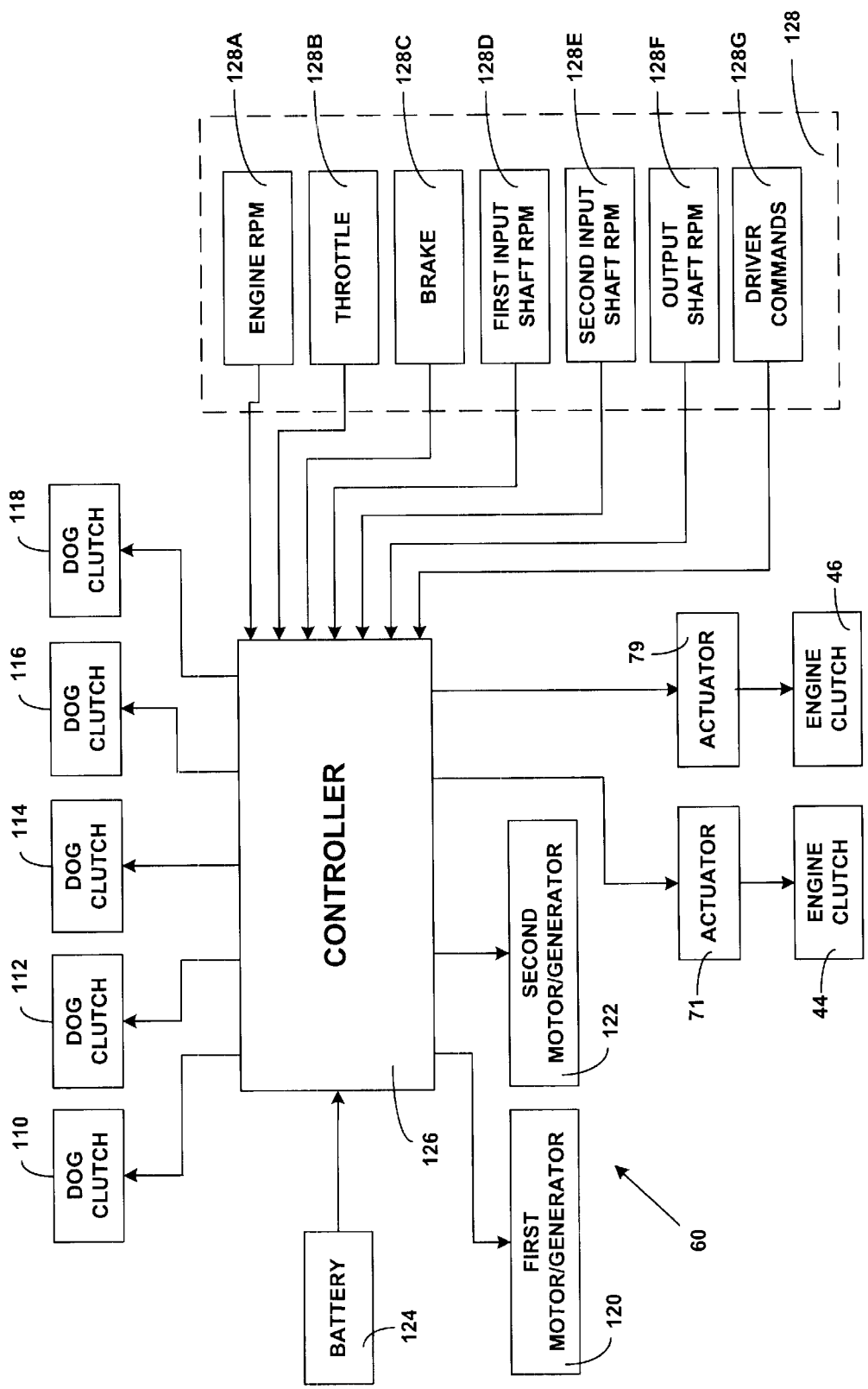
FIG. 3 is a diagrammatical illustration of the transmission control system adapted for use with the twin-clutch automated transmission shown in FIG. 2.

With reference to FIGS. 2 and 3 of the drawings, the structure and function of twin-clutch transmission 20 will now be described. Transmission 20 is driven by the output of engine 18 and generally includes a first engine clutch 44, a second engine clutch 46, a first input shaft 48, a second input shaft 50, a geartrain 52, a mainshaft 54, a transfer unit 56, and a shift control system 60.

First engine clutch 44 is a power-operated spring-apply plate-type clutch which is normally operable in its engaged state to establish a drive connection between the output of engine 18 and a transfer shaft 62. Likewise, second engine clutch 46 is a power-operated spring-apply plate-type clutch normally operable in its engaged state to establish a drive connection between the output of engine 18 and second input shaft 50. First engine clutch 44 includes a drive plate 64 fixed to the output of engine 18, a friction clutch plate 66 fixed to transfer shaft 62, an apply plate 68, and a spring-biased release mechanism 70 acting on apply plate 68. Release mechanism 70 is moveable to engage and release the drive connection between drive plate 64 and friction clutch plate 66. An actuator 71 is provided to control movement of release mechanism 70. Preferably, actuator 71 is an electrically-actuated device, such as an electromagnectic solenoid, that controls the position of release mechanism 70, and thus the magnitude of engagement of first engine clutch 44, in response to electric power being provided hereto.

Second engine clutch 46 includes a drive plate 72 fixed to drive plate 64, a friction clutch plate 74 fixed to second input shaft 50, an apply plate 76, and a spring-biased release mechanism 78 acting on apply plate 76. Release mechanism 78 is moveable to engage and release the drive connection between drive plate 72 and friction clutch plate 74. Similarly, an actuator 79 is provided to control movement of release mechanism 78. Actuator 79 is an electrically-actuated device that controls the position of release mechanism 78, and thus the magnitude of engagement of second engine clutch 46, in response to the electric power provided thereto. Shift control system 60 is operable to control actuators 71 and 79 and, in turn, the engagement and release of engine clutches 44 and 46. Second input shaft 50 is tubular and is concentrically supported on transfer shaft 62. As seen from the unrolled schematic view shown in FIG. 2, first input shaft 48 is offset from transfer shaft 62. However, a chain 80 meshed between a first sprocket 82 fixed to transfer shaft 62 and a second sprocket 84 fixed to first input shaft 48 provides a direct drive connection between transfer shaft 62 and first input shaft 48.

Geartrain 52 includes a first set of speed gears rotatably supported on first input shaft 48 and a second set of speed gears rotatably supported on second input shaft 50, both of which are in constant mesh with a set of output gears fixed to mainshaft 54. The first set of speed gears include a first speed gear 90 which is meshed with a first output gear 92, a third speed gear 94 which is meshed with a second output gear 96, and a fifth speed gear 98 which is meshed with a third output gear 100. Similarly, the second set of speed gears includes a second speed gear 102 which is meshed with first output gear 92, a fourth speed gear 104 which is meshed with second output gear 96, and a sixth speed gear 106 which is meshed with third output gear 100. Geartrain 52 also includes a third sprocket 108 rotatably supported on mainshaft 54 and which is also driven by chain 80.

Shift control system 60 includes a plurality of power-operated shift clutches which are operable for selectively coupling a selected speed gear to its corresponding input shaft for establishing six forward and one reverse speed ratio drive connections with mainshaft 54. Preferably, these shift clutches are electrically-actuated dog clutches. In particular, a first dog clutch 110 is operable for selectively coupling/releasing first speed gear 90 and third speed gear 94 to/from first input shaft 48, a second dog clutch 112 is operable for selectively coupling/releasing second speed gear 102 and fourth speed gear 104 to/from second input shaft 50, and a third dog clutch 114 operable for selectively coupling/releasing fifth speed gear 98 to first input shaft 48. Shift control system 60 also include a fourth dog clutch 116 that is operable for selectively coupling/releasing sixth speed gear 106 to/from second input shaft 50, and a fifth dog clutch 118 operable for selectively coupling/releasing third sprocket 108 to/from mainshaft 54. Each dog clutch includes a sliding sleeve (denoted by the suffix "A") which is splined for rotation with and axial movement on a clutch hub which, in turn, is fixed to a corresponding one of input shafts 48 and 50. As is conventional, axial movement of the sliding sleeves from the neutral uncoupled positions shown results in clutched engagement with the adjacent speed gear. Preferably, each dog clutch is of the electromagnetic type having a coil (denoted by suffix "B") adjacent to and facing a radial armature plate segment of each sliding sleeve. Electrical power delivered to the electromagnetic coils causes controlled axial movement of the shift sleeves. Since first clutch 110 and second clutch 112 are of the double-acting variety, a pair of coils are provided therewith. It is to be understood that any other type of power-operated device capable of moving each sliding sleeve between its uncoupled and coupled positions is within the scope of this invention.

Shift control system 60 further includes a first motor/generator 120 operably connected to transfer shaft 62, a second motor/generator 122 operably connected to second input shaft 50, a battery 124, a transmission controller 126, and vehicle sensors 128. First motor/generator 120 includes a fixed stator 120A and a rotor 120B that is fixed for rotation with transfer shaft 62. Alternatively, first motor/generator 120 could be operably connected to first input shaft 48 in which case rotor 120B would be fixed directly to first input shaft 48. Second motor/generator 122 includes a fixed stator 122A and a rotor 122B that is fixed for rotation with second input shaft 50. Controller 126 is an electronically-controlled unit capable of receiving data from vehicle sensors 128 and generating electric output signals in response to the sensor signals. Sensors 128 include engine speed 128A, throttle position 128B, brake status 128C, first input shaft speed 128D, second input shaft speed 128E, mainshaft speed 128F, and driver commands 128G. The driver command sensor detects movement of the gearshift lever and other operator-actuated devices.

Controller 126 functions to control shifting of motor/generators 120 and 122 between a "drive" mode, a "regeneration" mode, and a "no-load" mode. In the drive mode, the motor/generator functions as an electric motor and is driven by electric power. In the regeneration mode, the motor/generator functions as an electric generator with regenerative braking (brake torque generated by the motor/generator) for supplying electric energy to battery 124. In the no-load mode, the rotor of the motor/generator is free to rotate. Controller 126 is also operable to coordinate and monitor actuation of all the electrically-controlled devices associated with transmission 20 to permit powershifted sequential gear changes automatically without any input from the vehicle operator.

With continued reference to FIG. 2, transfer unit 56 is shown to include a transfer shaft 130 driven by mainshaft 54, and an interaxle differential 132 operable for transferring drive torque from transfer shaft 130 to front output shaft 40 and rear output shaft 30 while facilitating speed differentiation therebetween. As such, transmission 20 establishes a full-time four-wheel drive mode of operation. As seen, a transfer gear 134 is fixed to transfer shaft 130 and is in constant mesh with second output gear 96 such that transfer shaft 130 is driven by mainshaft 54. Differential 132 is shown as a planetary gearset having a ring gear 136 fixed for rotation with rear output shaft 30, a sun gear 138 fixed for rotation with front output shaft 40, and pinion gears 140 meshed with ring gear 136 and sun gear 138. Pinion gears 140 are rotatably supported on pinion shafts 142 that are fixed to a planet carrier 144 which, in turn, is fixed for rotation with transfer shaft 130. A parking wheel 146 is fixed to rear output shaft 30 and can be releasably latched via a moveable parking pawl 147 to a stationary member (i.e., the housing of transmission 20) to selectively prevent rotation of rear output shaft 30. It is to be understood that the specific configuration for interaxle differential 132 is merely exemplary and that other planetary-type and bevel-type differentials used in automotive driveline applications are contemplated to be applicable for use with transmission 20.

When it is desired to operate the vehicle, engine 18 is started with the gearshift lever in its PARK position and both engine clutches 44 and 46 engaged such that both input shafts 48 and 50 are in drive connection with the output of engine 12. With the input shafts driven, motor/generators 120 and 122 can be turned off or both can be in their regeneration mode for developing electrical power which is routed to charge battery 124. However, all of the electrically-actuated dog clutches are released with each shift sleeve located in its neutral uncoupled position, whereby no drive torque is delivered through geartrain 52 to transfer shaft 130. When the vehicle operator moves the gearshift lever from the PARK position to a DRIVE position, parking pawl 147 is released and first engine clutch 44 is also released. In particular, controller 126 actuates first actuator 71 for releasing first engine clutch 44, whereby the drive connection between engine 18 and first input shaft 48 is released. Controller 126 also shifts first motor/generator 120 into its regeneration mode for causing rotor 120B to retard the rotary speed of first input shaft 48 to match the rotary speed of mainshaft 54. Upon completion of speed synchronization, first dog clutch 110 is actuated by controller 126 sending an electrical signal to coil 110B for moving sliding sleeve 110A into clutched engagement with first speed gear 90. As such, first speed gear 90 is coupled for rotation with first input shaft 48, whereby the first forward speed ratio drive connection is established between first input shaft 48 and transfer shaft 130. Controller 126 then functions to turn off first motor/generator and progressively engage first engine clutch 44 for accelerating the vehicle.

Thereafter, when the vehicle operating parameters indicate a need to shift transmission 20 into the second forward gear ratio, controller 126 actuates second actuator 79 for releasing second engine clutch 46, whereby the drive connection between engine 18 and second input shaft 50 is released. Thereafter, controller 126 shifts second motor/generator 122 into its regeneration mode for retarding the rotary speed of second input shaft 50 so as to synchronize its rotary speed to that of second speed gear 102 which is driven by first output gear 92 on mainshaft 54. When controller 126 determines that speed synchronization is complete, coil 112B of second dog clutch 112 is activated by controller 126 for moving sliding sleeve 112A such that second speed gear 102 is coupled to second input shaft 50. Next, controller 126 turns off second motor/generator 122. Thereafter, controller 126 coordinates the release of first engine clutch 44 and the re-engagement of second engine clutch 46. Once first engine clutch 44 is released completely, controller 126 causes first dog clutch 110 to return sliding sleeve 110A to its neutral position for uncoupling first speed gear 90 from first input shaft 48.

As will be appreciated, this upshift process continues through each of the other forward speed gear ratios and likewise works in reverse for downshifts to establish six sequential forward gear ratios. Specifically, the motor/generators are placed in their regeneration mode during upshifts to retard the associated shaft speed into synchronization with the driven components of geartrain 52. In contrast, the motor/generators are placed in their drive modes during downshifts to increase the associated shaft speed during the synchronization process. When the gearshift lever is shifted into its REVERSE position, fifth dog clutch 118 is actuated by controller 126 for causing sleeve 118A to move into clutched engagement with third sprocket 108 for driving transfer shaft 130 in the opposite direction. With this automated powershift methodology, transmission 20 shifts between engine clutches utilizing a power-on shift strategy (i.e. no power interruption).

Figure 4:
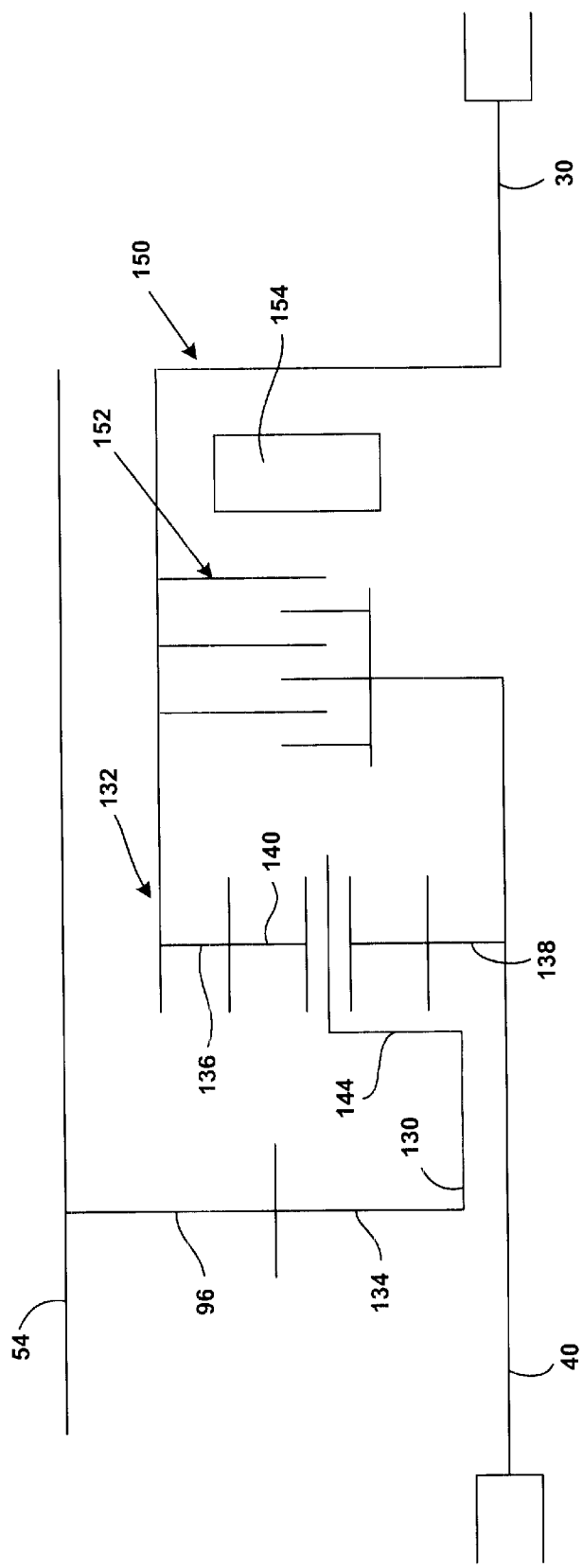
FIG. 4 is a partial schematic view of the automated twin-clutch transmission according to a second embodiment of the present invention.

Referring now to FIG. 4, a portion of twin-clutch automated transmission 20 is schematically shown to be optionally equipped with a biasing clutch 150 that is operable to limit slip and vary the torque bias delivered across differential 132 to output shafts 30 and 40. Biasing clutch 150 includes a clutch pack 152 disposed between ring gear 136 and sun gear 138, and an actuator 154 for exerting a clutch engagement force on clutch pack 152. Biasing clutch 150 is operable in various actuated states to define distinct four-wheel drive modes. Specifically, biasing clutch 150 can be maintained in a non-actuated state to establish the full-time four-wheel drive mode. Biasing clutch 150 is also operable in a fully-actuated state for establishing a locked four-wheel drive mode in which speed differentiation across interaxle differential 132 is inhibited. Finally, biasing clutch 150 can also regulate torque bias and speed differentiation automatically between its non-actuated and fully-actuated states in response to and as a function of the amount of relative rotation between output shafts 30 and 40 for establishing an all-wheel drive mode.

Automatic control of biasing clutch 150 can be provided via a "passive" control system or an "active" control system. In a passive system, biasing clutch 150 can be configured as a hydromechanical coupling with actuator 154 operable to progressively vary the clutch engagement force exerted on clutch pack 152 as a function of the amount of interaxle slip. Examples of applicable couplings include geared traction units, viscous couplings, and fluid pump actuators of the type disclosed in commonly owned U.S. Pat. Nos. 5,176, 235, 5,456,642 and 6,041,903 which are hereby incorporated by reference.

Preferably, actuator 154 is a power-operated device which is adaptively controlled by controller 126. Specifically, controller 126 receives a driver command mode signal from a mode selector 160 under the control of the vehicle operator to select operation in either of an Automatic mode or a Locked mode. In the Automatic mode, controller 126 continuously regulates the actuated condition of biasing clutch 150 through power-operated actuator 154 in response to the sensor signals. In addition to the sensors previously disclosed, a rear speed sensor 162 detects the rotary speed of rear output shaft 30 while a front speed sensor 164 detects the rotary speed of front output shaft 40. In the Locked mode, biasing clutch 150 is maintained in a fully-actuated condition.

Figure 5:
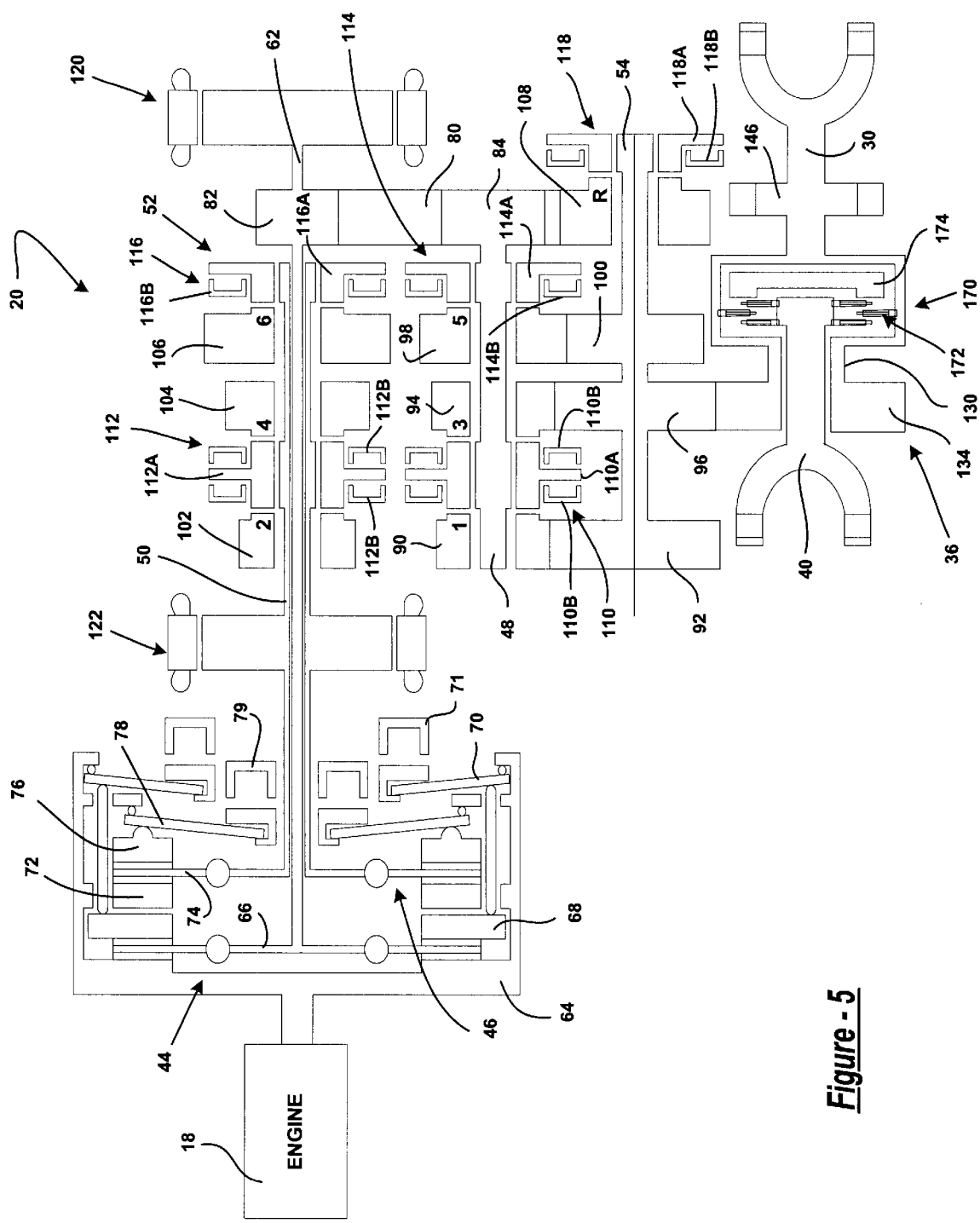
FIG. 5 is a partial schematic view of the automated twin-clutch transmission according to a third embodiment of the present invention.

With reference now to FIG. 5, an "on-demand" version of twin-clutch automated transmission 20 is schematically shown with interaxle differential 132 eliminated and a transfer clutch 170 arranged to passively or actively transfer drive torque from rear output shaft 30 to front output shaft 40. In this arrangement, power from transfer shaft 130 is directly transmitted to rear output shaft 30 to establish a two-wheel drive mode such that power is delivered only to rear driveline 12. As seen, transfer clutch 170 includes a clutch pack 172 disposed between the output shafts and an actuator 174 for exerting the clutch engagement force on clutch pack 172. Thus, mode selector 160 would permit the vehicle operator to select between a two-wheel drive mode, an on-demand four-wheel drive mode, and a locked four-wheel drive mode. As mentioned, in the two-wheel drive mode, transfer clutch 170 is released such that no power is delivered to front driveline 14. In the locked four-wheel drive mode, transfer clutch 170 is full-actuated to effectively couple front output shaft 40 for rotation with rear output shaft 30. Finally, in the on-demand four-wheel drive mode the actuated condition of transfer clutch 170 is continuously varied in response to vehicle conditions to regulate the amount of drive torque delivered to front driveline 14

As a further feature of the present invention, transmission 20 can be used in conjunction with engine 18 to define a hybrid electric drive system. In general, the hybrid electric drive system includes three power sources, namely, engine 18, first motor/generator 120, and second motor/generator 122. The hybrid electric drive system is capable of operation in several distinct modes, namely: (a) an electric mode; (b) a hybrid mode; (c) an engine mode; and (d) a charging mode. In the electric mode, engine 18 is off and motor/generators 120 and 122 are used to provide motive power to mainshaft 54 of transmission 20. In the engine mode, transmission 20 functions as previously described with engine power delivered through engine clutches 44 and 46 and motor/generators 120 and 122 only used for speed synchronization during gear shifts. Finally, in the charging mode, a portion of the engine power is absorbed by one of motor/generators 120 and 122 to charge battery 124. To provide such a hybrid drive system, controller 126 would also control engine management systems (i.e., ignition, valve timing, fuel injectors, etc.) of the vehicle and transition between the various operating modes would be transparent to the vehicle operator.

Thus, the four-wheel transmissions of the present invention utilize the components typically associated with a manually-shifted synchromesh transmission in combination with power-operated dog clutches, a twin engine clutch arrangement, and a transfer case to provide a compact powershifted automated multi-speed four-wheel drive transmission. The use of a compact geartrain allows a desired speed gear to be pre-selected and engaged while disconnected from the engine and thereafter driven by shifting between the engine clutches. Moreover, the use of all electric powered actuators for the engine clutches, dog clutches and motor/generators eliminates the need for a hydraulic system and should promote a highly efficient transmission since electric power is only required for shifting.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A twin-clutch transmission for use in a motor vehicle having an engine and first and second drivelines, comprising:
    a first input shaft rotatably supporting a first speed gear;
    a second input shaft rotatably supporting a second speed gear;
    a mainshaft having an output gear fixed thereto which is meshed with said first and second speed gears;
    a first engine clutch operable for establishing a releasable drive connection between the engine and said first input shaft;
    a first shift clutch operable for releaseably coupling said first speed gear to said first input shaft to establish a drive connection between said first input shaft and said mainshaft;
    a second engine clutch operable for establishing a releasable drive connection between the engine and said second input shaft;
    a second shift clutch operable for releasably coupling said second speed gear to said second input shaft to establish a drive connection between said second input shaft and said mainshaft;
    a first output shaft adapted for connection to the first driveline;
    a second output shaft adapted for connection to the second driveline;
    an interaxle differential driven by said mainshaft and operably interconnecting said first and second output shafts;
    a first motor/generator connected to said first input shaft;
    a second motor/generator connected to said second input shaft; and
    a controller for controlling actuation of said first and second motor/generators.

2. The twin-clutch transmission of claim 1 further comprising:
    a first electrically-powered actuator controlling actuation of said first engine clutch; and
    a second electrically-powered actuator controlling actuation of said second engine clutch;
    wherein said controller controls actuation of said first and second actuators.

3. The twin-clutch transmission of claim 2 wherein said first and second shift clutchs are electrically-actuated dog clutches controlled by said controller.

4. The twin-clutch transmission of claim 1 wherein said first motor/generator has a first rotor adapted to drive or be driven by said first input shaft, and said second motor/generator has a second rotor adapted to drive or be driven by said second input shaft, whereby when said first input shaft is released from driven connection with the engine and said first shift clutch is disengaged, said first motor/generator is actuated to synchronize the rotary speed of said first input shaft to that of said first speed gear driven by said output gear.

5. The twin-clutch transmission of claim 1 further comprising:
    a second output gear fixed to said mainshaft;
    a third speed gear rotatably supported on said first input shaft and meshed with said second output gear; and
    a fourth speed gear rotatably supported on said second input shaft and meshed with said second output gear;
    wherein said first shift clutch is operable for releasably coupling said third speed gear to said first input shaft, and said second shift clutch is operable for releasably coupling said fourth speed gear to said second input shaft.

6. The twin-clutch transmission of claim 1 wherein said first and second engine clutches and said first and second shift clutches are electrically-actuated devices controlled by said controller for automatically shifting between a first gear ratio established by said first speed gear and a second gear ratio established by said second speed gear.

7. The twin-clutch transmission of claim 6 wherein said first and second shift clutches are electrically-actuated dog clutches.

8. The twin-clutch transmission of claim 1 further comprising a biasing clutch for controlling torque distribution between said first and second output shafts.

9. The twin-clutch transmission of claim 8 wherein said biasing clutch includes a clutch pack operably connected to said interaxle differential, and a power-operated actuator controlled by said controller for exerting a variable clutch engagement force on said clutch pack.

10. The twin-clutch transmission claim 1 wherein said interaxle differential includes a transfer shaft having a transfer gear fixed thereto that is meshed with said output gear, an input member driven by said transfer shaft, a first output member driving said first output shaft, and a second output member driving said second output shaft.

11. A twin-clutch transmission for use in a motor vehicle having an engine and first and second drivelines;
    a first output shaft adapted for connection to the first driveline;
    a second output shaft adapted for connection to the second driveline;
    a first input shaft;
    a second input shaft;
    a first engine clutch operable for establishing a releasable drive connection between the engine and said first input shaft;
    a second engine clutch operable for establishing a releasable drive connection between the engine an d said second input shaft;
    a geartrain including first and second output gears fixed to a mainshaft, a first speed gear supported on said first input shaft and meshed with said first output gear, a second speed gear supported on said second input shaft and meshed with said first output gear, a third speed gear supported on said first input shaft and meshed with said second output gear, and a fourth speed gear supported on said second input shaft and meshed with said second output gear;

an interaxle differential driven by said mainshaft and interconnecting said first and second out put shafts;

a first shift clutch operable for releasable coupling said first and third speed gears to said first input shaft;

a second shift clutch operable for releasably coupling said second and fourth speed gears to said second input shaft;

a first motor/generator connected to said first input shaft;

a second motor/generator connected to said second input shaft; and a transmission controller for controlling coordinated actuation of said first and second engine clutches, said first and second shift clutches and said first and second motor/generators to cause powershift sequential gear shifts, such that when one of said first and second input shafts is released from driven connection with the engine, said motor/generator associated with the released one of said first and second input shafts is actuated to synchronize the rotary speed of the released one of said first and second input shaft with said mainshaft.

12. The twin-clutch transmission of claim 11 wherein said first and second engine clutches and said first and second shift clutches are power-operated devices controlled by said transmission controller for automatically shifting between a first gear ratio established by said first speed gear, a second gear ratio established by said second speed gear, a third gear ratio established by said third speed gear, and a fourth gear ratio established by said fourth speed gear.

13. The twin-clutch transmission of claim 11 wherein said first and second shift clutches are electrically-actuated dog clutches.

14. The twin-clutch transmission of claim 11 wherein said first and second engine clutches are electrically-actuated by first and second electromagnetic solenoids controlled by said transmission controller.

15. The twin-clutch transmission of claim 11 wherein said first motor/generator has a first rotor adapted to drive or be driven by said first input shaft, and said second motor/generator has a second rotor adapted to drive or be driven by said second input shaft, whereby when said first input shaft is released from driven connection with the engine and said first shift clutch is disengaged, said first motor/generator is actuated to synchronize the rotary speed of said first input shaft to that of said first speed gear driven by said first output gear.

16. The twin-clutch transmission of claim 11 further comprising a biasing clutch for controlling torque distribution between said first and second output shafts.

17. The twin-clutch transmission of claim 11 wherein said interaxle differential includes a transfer shaft having a transfer gear fixed thereto in meshed engagement with said output gear, an input member driven by said transfer shaft, a first output member driving said first output shaft, and a second output member driving said second output shaft.

18. A twin-clutch transmission for use in a motor vehicle having an engine and first and second drivelines, comprising:

a first input shaft rotatably supporting a first speed gear;

a second input shaft rotatably supporting a second speed gear;

a mainshaft having an output gear fixed thereto which is meshed with said first and second speed gears;

a first engine clutch operable for establishing a releasable drive connection between the engine and said first input shaft;

a first shift clutch operable for releaseably coupling said first speed gear to said first input shaft to establish a drive connection between said first input shaft and said mainshaft;

a second engine clutch operable for establishing a releasable drive connection between the engine and said second input shaft;

a second shift clutch operable for releasably coupling said second speed gear to said second input shaft to establish a drive connection between said second input shaft and said mainshaft;

a first output shaft driven by said mainshaft and adapted for connection to the first driveline;

a second output shaft adapted for connection to the second driveline;

a transfer clutch for transferring drive torque from said first output shaft to said second output shaft;

a first motor/generator connected to said first input shaft;

a second motor/generator connected to said second input shaft; and a controller for controlling actuation of said first and second motor/generators.

19. The twin-clutch transmission of claim 18 wherein said first motor/generator has a first rotor adapted to drive or be driven by said first input shaft, and said second motor/generator has a second rotor adapted to drive or be driven by said second input shaft, whereby when said first input shaft is released from driven connection with the engine and said first shift clutch is disengaged, said first motor/generator is actuated to synchronize the rotary speed of said first input shaft to that of said first speed gear driven by said output gear.

20. The twin-clutch transmission of claim 18 wherein said first and second engine clutches and said first and second shift clutches are electrically-actuated devices controlled by said controller for automatically shifting between a first gear ratio established by said first speed gear and a second gear ratio established by said second speed gear.

21. The twin-clutch transmission of claim 18 wherein said first and second engine clutches and said first and second shift clutches are electrically-actuated devices controlled by said controller for automatically shifting between a first gear ratio established by said first speed gear and a second gear ratio established by said second speed gear.

22. The twin-clutch transmission of claim 18 wherein said transfer clutch includes a clutch pack disposed between said first and second output shafts, and a clutch actuator for exerting a clutch engagement force on said clutch pack to establish an on-demand four-wheel drive mode.

23. The twin-clutch transmission of claim 22 wherein said clutch actuator is a power-operated device controlled by said controller.

* * * * *